United States Patent

[11] 3,578,911

[72] Inventors Warren G. Bender
Wellesley;
Robert C. MacKenzie, Franklin, Mass.

[21] Appl. No. 10,849
[22] Filed Feb. 12, 1970
[45] Patented May 18, 1971
[73] Assignee Communication Technology, Inc.
Burlington, Mass.

[54] TELEPHONE WIRE PAIR COMPENSATOR UTILIZING NEGATIVE CAPACITANCE CIRCUIT
11 Claims, 3 Drawing Figs.

[52] U.S. Cl. .......... 178/45, 179/79, 307/295, 333/28, 333/80
[51] Int. Cl. .......... H04b 3/18, H03h 11/00
[50] Field of Search .......... 178/45, 46; 179/78—80, 170 (NC) (Inquired); 307/295; 333/28, 80, 80 (T)

[56] References Cited
UNITED STATES PATENTS
2,823,357 2/1958 Hall, Jr. .......... 333/80 (T)
2,943,272 6/1960 Feldman .......... 179/80 (X)

*Primary Examiner*—Herman Karl Saalbach
*Assistant Examiner*—Paul L. Gensler
*Attorney*—Kenway, Jenney and Hildreth

ABSTRACT: Apparatus is disclosed for compensating a telephone wire pair to alleviate transmission degradation caused by wiring capacitance. A negative capacitance effect is provided by employing positive capacitive feedback around each of two complementary transistor pairs. The pairs are also complementary in conductivity types with respect to each other and are connected effectively in series across a DC potential source so as to operate efficiently and in a balanced manner in a telephone environment.

Patented May 18, 1971 3,578,911

2 Sheets-Sheet 1

INVENTORS
WARREN G. BENDER
ROBERT C. MacKENZIE
BY
Kenway, Jenney & Hildreth
ATTORNEYS INVENTORS
WARREN G. BENDER
ROBERT C. MacKENZIE
BY
Kenway, Jenney + Hildreth
ATTORNEYS

TELEPHONE WIRE PAIR COMPENSATOR UTILIZING NEGATIVE CAPACITANCE CIRCUIT

BACKGROUND OF THE INVENTION

This invention relates to apparatus for compensating a telephone wire pair and more particularly to such apparatus providing negative capacitance.

Wiring capacitance adversely affects the performance of telephone wire pairs in various circumstances. Fore example, shunt capacitance affects the length of wire which may be used in a transmission line without the need for loading to maintain frequency response. Further, capacitive loading in lines in trunk station switching systems can interfere with the selection of an easily obtainable network build-out (NBO) capacitance value in the hybrid circuits typically used in going from two-wire to four-wire signal handling systems.

Among the several objects of the present invention may be noted the provision of a novel use of a negative capacitance element for compensating a telephone wire pair to offset transmission degradation caused by wiring capacitance; the provision of a negative capacitance element which is balanced in electrical operation; the provision of such an element which operates efficiently in a telephone system environment and which uses commonly available telephone system supply voltages; the provision of such an element which is relatively simple and inexpensive and which is highly reliable. Other objects and features will be in part apparent and in part pointed out hereinafter.

SUMMARY OF THE INVENTION

Briefly, a balanced negative capacitive element for use in accordance with the present invention for compensating a telephone wire pair involves first and second pairs of transistors, each pair having an input transistor and an output transistor which are of complementary conductivity types, the two output transistors also being of complementary conductivity types. Respective resistances provide in-phase negative feedback around the respective transistor pairs and each pair is also provided with a respective capacitor connecting the collector of the output transistor to the base of the input transistor thereby to provide positive capacitive feedback around the respective transistor pair. Thus, a negative capacitance is presented to each of the wires in a telephone pair connected to the base terminals of the input transistors.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
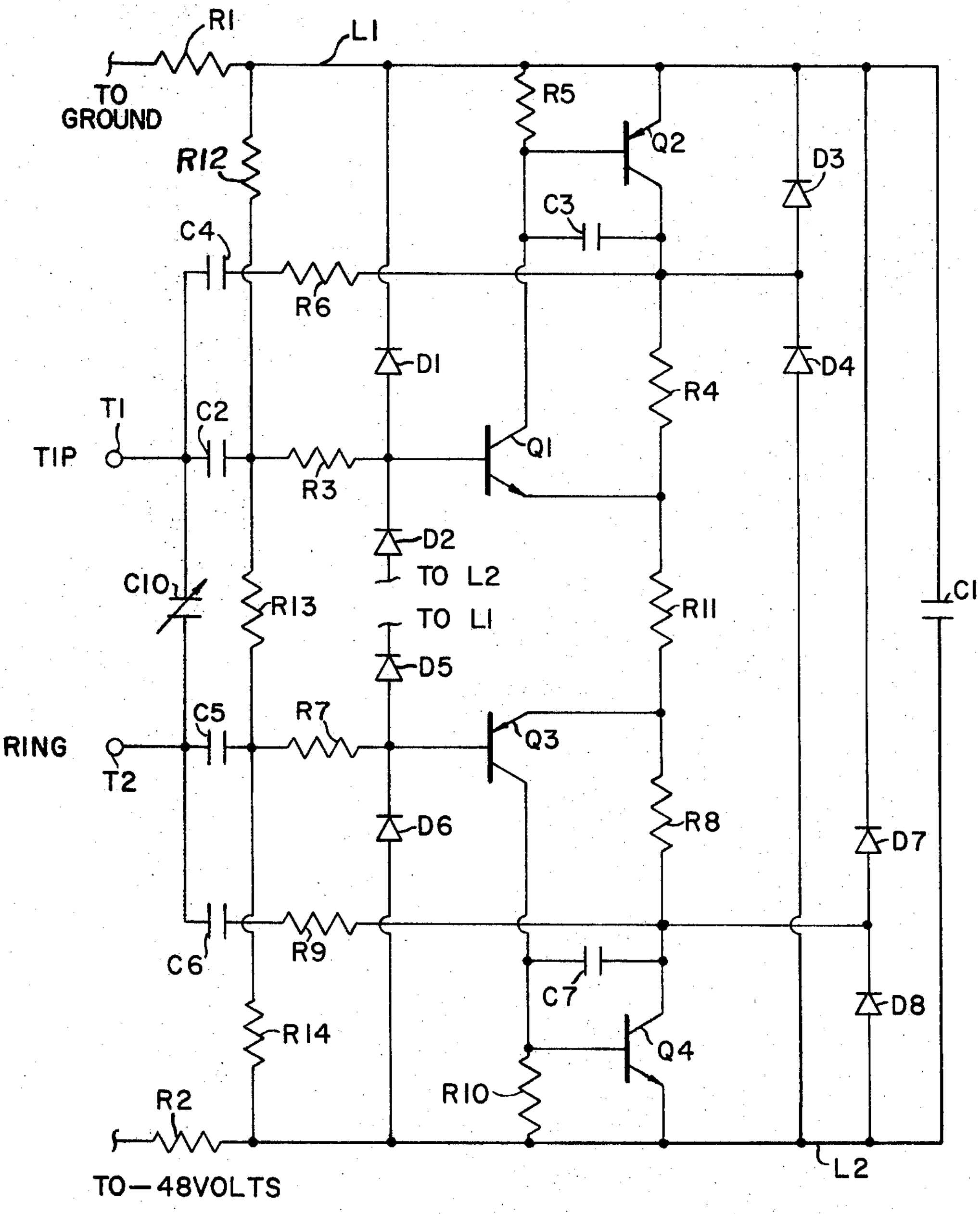
FIG. 1 is a schematic circuit diagram of a negative capacitive element for compensating a telephone wire pair in accordance with the present invention.

Referring now to FIG. 1, the negative capacitance element illustrated there is adapted to operate from the standard telephone supply potential of 48 volts DC. A pair of supply leads are indicated at L1 and L2. The positive supply lead L1 is connected to ground and the positive terminal of the 48 volt source through an isolating resistor R1. The negative supply lead L2 is connected to a negative 48 volt source through an isolation resistor R2. Filtering is provided by a capacitor C1.

A pair of input terminals T1 and T2 are provided for connection to a telephone wire pair. In conventional fashion, these terminals are designated TIP and RING respectively. Terminal T1 is connected to the base terminal of a first input transistor Q1 through a capacitor C2 and a resistor R3.

Capacitor C2 is of relatively large value so that substantially all frequencies of interest in a telephone voice signal are transmitted to the input transistor. Input transistor Q1 is of the NPN conductivity type and, together with an output transistor Q2 which is of the PNP-type, forms a first complementary transistor pair.

The collector of transistor Q1 is connected directly to the base of transistor Q2 while the collector of transistor Q2 is connected, through a resistor R4, to the emitter of transistor Q1. As is explained in greater detail hereinafter, this latter connection provides negative, in-phase feedback around the transistor pair. The base-emitter circuit of transistor Q2 is shunted by a resistor R5 for bypassing leakage currents while the collector-base circuit of this transistor is shunted by a small capacitor C3 for providing a desired high frequency rolloff.

Positive capacitive feedback is provided around this first transistor pair by a capacitor C4 which connects the input terminal T1, and thus also the base of transistor Q1, to the collector of transistor Q2. A resistor R6 in series with capacitor C4 limits the signal current at high frequencies.

The input terminal T2 is connected to the base terminal of a second input transistor Q3 in similar fashion, that is, through a capacitor C5 and a resistor R7. Transistor Q3, however, is of the PNP-type and is thus opposite in conductivity type to the first input transistor Q1. A second output transistor Q4, which is of the NPN-type forms a second complementary transistor pair with the PNP input transistor Q3. This second output transistor Q4 is thus opposite in conductivity type to the first output transistor Q2. Though transistors Q3 and Q4 are opposite in conductivity types to the corresponding transistors Q1 and Q2 connected to the first input terminal T1, they are otherwise similarly interconnected with each other; the collector of transistor Q3 being connected directly to the base of transistor Q4; the collector of transistor Q4 being connected to the emitter of transistor Q3 through a resistor R8 so as to provide negative in-phase feedback; and the collector of transistor Q4 being connected, through resistor R9 and capacitor C6, to the second input terminal T2 so as to provide positive capacitive feedback to the base of transistor Q3. The various shunting elements such as capacitor C7 and resistor R10 are likewise similarly arranged.

The emitter of transistor Q2 is connected to the positive supply lead L1 while the emitter of transistor Q4 is connected to the negative supply lead L2. Further, these two output transistors are effectively connected collector-to-collector in series across this DC potential source through a resistor R11. Resistor R11 is thus in series with the two collector-emitter circuits through resistors R4 and R8.

Suitable bias voltages are applied to the base terminals of the two input transistors Q1 and Q3 by a voltage divider comprising resistors R12—R14 connected in series across the supply leads L1 and L2. Each pair of transistors is biased into conduction and functions as a complementary cascade amplifier as will be understood by those skilled in the art. The source voltage is thus divided across the output transistors Q2 and Q4 and the resistors R4, R8 and R11. As will also be understood, the negative in-phase feedback around each transistor pair stabilizes the gain of that transistor pair. Thus, the amount of positive capacitive feedback applied, through the capacitors C4 and C6, to the respective input terminals T1 and T2 will be precisely predetermined.

As is understood, the application of positive capacitive feedback to the input terminal of an amplifying circuit effectively produces a negative capacitance at that point. In the present circuit, this negative capacitance is useful to cancel wiring capacitance as explained hereinbefore. As the amount of capacitance which may need to be cancelled may vary according to circumstances, the effective net negative capacitance which is present may be adjusted by means of a variable capacitance C10 which is connected across the input terminals T1 and T2. In actual practice, this variable capacitance may be made up of a plurality of fixed-value capacitors which may be strapped together in various combinations to give the selected capacitance value.

To prevent damage which might otherwise be caused by high voltage transients, excursions of the voltage at the base of either of the input transistors or at the collector of either of the output transistors is prevented by a respective pair of diodes D1–D8 which connect each such point to the supply leads.

Since the output transistors Q2 and Q4 are effectively connected in series across the standard telephone system supply voltage, this source of power is efficiently utilized to provide the desired negative capacitance without excessive dissipation. Likewise, as will be understood by those skilled in the art, this negative capacitance element is balanced or symmetrical with respect to the pair of leads connected to it.

Figure 2:
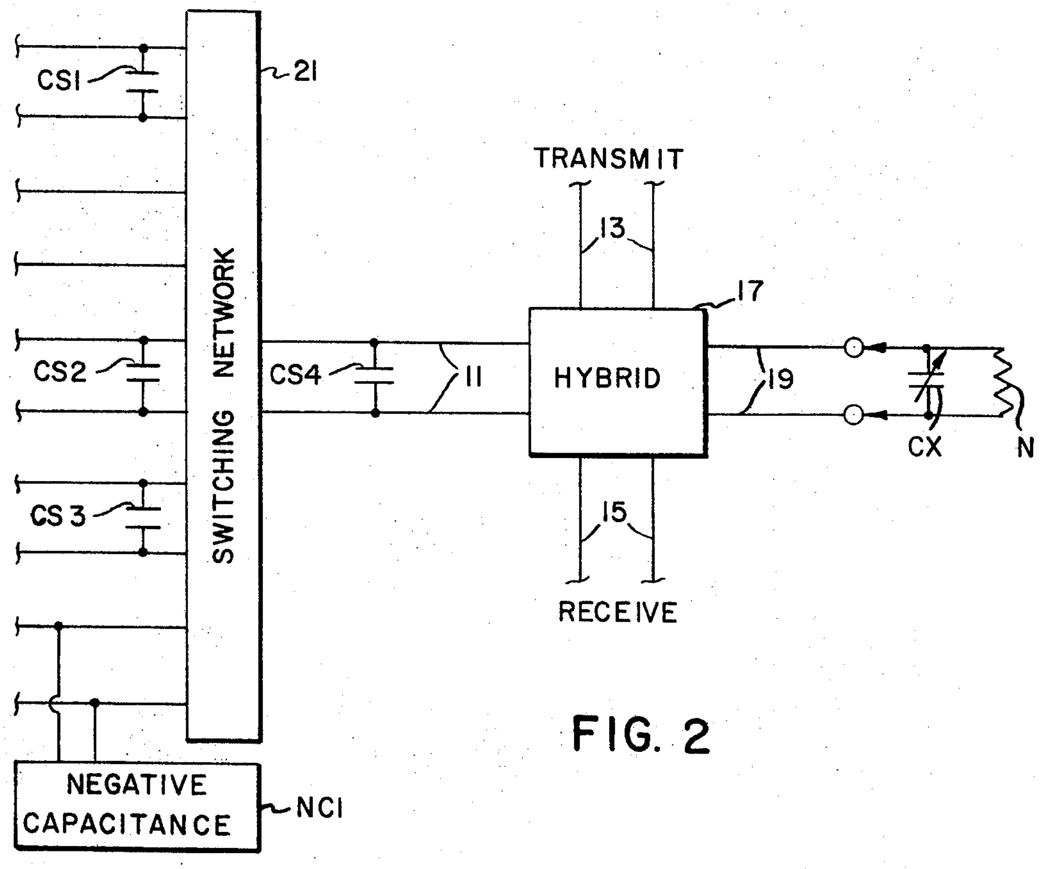
FIG. 2 is a block diagram illustrating the use of the negative capacitive element of FIG. 1 as part of a drop build-out network for a telephone hybrid circuit.

FIG. 2 illustrates an application in which the negative capacitance element of FIG. 1 is particularly useful. In various toll switching systems, an incoming two-wire signal system, comprising a wire pair 11, is converted to a four-wire system comprising a transmit pair 13 and a receive pair 15. The conversion is provided by a hybrid transformer or four-wire terminating set as indicated at 17. Another wire pair 19 is typically brought out from the hybrid for the purpose of balancing or compensating the hybrid to the nominal impedance value of the incoming pair 11, i.e., to match the arbitrary office impedance, typically 600 or 900 ohms plus 2 microfarads. Various impedances or combinations thereof, e.g., a network N plus capacitors as indicated at CX, may be applied across this pair for this purpose. The additional capacitance is typically referred to as network build-out (NBO).

Typically, however, the pair 11 feeding the hybrid may, in fact, be connected to any one of a plurality of pairs through a switching network, as indicated at 21. Thus, for a given network build-out value CX to be proper, each of the pairs which can be switched onto the input pair 11 by the network 21 must present substantially the same impedance value. This is conventionally provided by adding shunt capacitance to certain of the pairs, e.g., as indicated at CS1—CS4, to bring their impedance values up to the value of the pair with the most shunt or wiring capacitance. This added impedance is typically referred to as an drop build-out (DBO). Often, however, this may require an inordinate addition of shunting capacitance. Also, the calculations required for determining the average value of DBO are very tedious. Further, the later addition of a new pair may require that all pairs be readjusted.

Such extreme complications of capacitance build-out patterns can be avoided by cancelling capacitance in the most heavily loaded lines to bring them to a nominal value appropriate for the entire set. Thus, assuming that the last pair in FIG. 2 is the most heavily loaded, the addition of a negative capacitive element NC1, e.g., such as that illustrated in FIG. 1, will reduce the effective value of loading of this pair so as to be consistent with the other pairs in the group.

Figure 3:
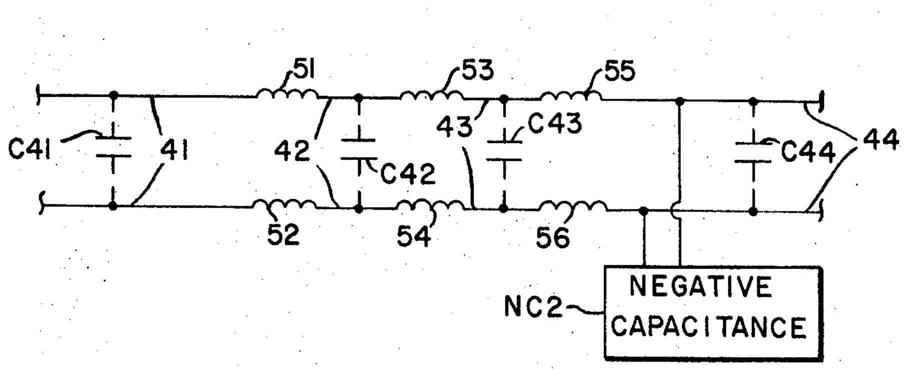
FIG. 3 is a block diagram illustrating the use of the negative capacitance element of FIG. 1 in a telephone transmission system.

FIG. 3 illustrates the application of the present invention to a telephone transmission system to facilitate proper loading. The transmission system comprises a plurality of wire sections designated 41—44. Associated with each section is a certain value of wiring capacitance, designated C41—C44, which effectively shunts the section. According to well-known principles, the wiring sections are normally of equal length and thus have equal shunt capacitances. Thus, the transmission characteristics of the system can be enhanced by inserting conventional loading coils, as indicated at 51—56, between adjacent sections. However, in some situations, it may not be practical to make all the sections of the same length. For example, in crossing desolate countryside, it may not be convenient to insert a loading coil at the desired location. Also, the distance to be covered may not be an integer multiple of the desired or standard section length. In this latter case it is conventional to use a short section at the end of the transmission system and then add shunt capacitance to that section to bring the capacitance value up to that of the other sections.

In accordance with the present invention, however, longer than standard sections may be accommodated. In FIG. 3, for example, it is assumed that the shunt capacitance of the last section C44 is larger than that of the other sections. Rather than dividing the last section by inserting another set of loading coils and then adding shunt capacitance to the resulting short section, a negative capacitance element NC2 is connected parallel with the shunt capacitance of the last section so as to cancel the excess capacity. In this way, a set of loading coils is eliminated and yet the loading scheme is preserved. It should be noted that the negative impedance presented in accordance with the present invention is substantially purely capacity and does not include any significant negative resistance component since no gain is to be produced.

While the selection of particular component values and types to fit a given application is clearly within the ability of one skilled in the art, is may be noted that a particular embodiment of the apparatus of FIG. 1 was constructed using component values and types as designated in the following table and excellent results were obtained.

| | | |
|---|---|---|
| R1 | 1 K. | ohms |
| R2 | 1 K. | ohms |
| R3 | 10 K. | ohms |
| R4 | 3 K. | ohms |
| R5 | 10 K. | ohms |
| R6 | 10 | ohms |
| R7 | 10 K. | ohms |
| R8 | 3 K. | ohms |
| R9 | 10 | ohms |
| R10 | 10 K. | ohms |
| R11 | 1.5 K. | ohms |
| R12 | 62 K. | ohms |
| R13 | 24 K. | ohms |
| R14 | 62 K. | ohms |
| C1 | 10 | microfarads |
| C2 | 0.22 | microfarads |
| C3 | 20 | picofarads |
| C4 | 0.27 | microfarads |
| C5 | 0.22 | microfarads |
| C6 | 0.027 | microfarads |
| C7 | 20 | picofarads |
| C10 | 0.054 | microfarads (max.) |
| Q1 | 2 N2270 | |
| Q2 | 1 2 N4036 | |
| Q3 | 2 N4036 | |
| Q4 | 2 N2270 | |
| D1—D8 | 1 N4454 | |

It should be understood that various similar circuit arrangements can be constructed to provide substantially the same function and that such arrangements may also be formed as integrated circuits rather than by the assembly of so-called discrete components.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

We claim:

1. A balanced negative capacitance element for compensating a telephone wire pair, said element comprising:
   - a first input transistor of a first conductivity type;
   - a first output transistor of a second conductivity type which is complementary to said first type, said first input transistor and said first output transistor forming a first transistor pair;
   - means connecting the collector of said first input transistor to the base of said first output transistor;
   - resistance means for providing negative in-phase feedback around said first transistor pair;
   - means including a first capacitor for providing positive capacitive feedback around said first transistor pair;

a second input transistor, said second input transistor being of said second conductivity type;

a second output transistor, said second output transistor being of said first conductivity type, said second input transistor and said second output transistor forming a second transistor pair;

means connecting the collector of said second input transistor to the base of said second output transistor;

resistance means for providing negative in-phase feedback around said second transistor pair;

means including a second capacitor for providing positive capacitive feedback around said second transistor pair;

circuit means for connecting said first and second output transistors in series across a DC potential source; and means for connecting each of the wires in said telephone pair to one of said input transistors.

2. A balanced negative capacitance element for compensating a telephone wire pair, said element comprising:

a first input transistor of a first conductivity type;

a first output transistor of a second conductivity type which is complementary to said first type, said first input transistor and said first output transistor forming a first transistor pair;

means connecting the collector of said first input transistor to the base of said first output transistor;

means including a first resistance connecting the collector of said first output transistor to the emitter of said first input transistor thereby to provide negative in-phase feedback around said first transistor pair;

means including a first capacitor connecting the collector of said first output transistor to the base of said first input transistor thereby to provide positive capacitive feedback around said first transistor pair;

a second input transistor, said second input transistor being of said second conductivity type;

a second output transistor, said second output transistor being of said first conductivity type, said second input transistor and said second output transistor forming a second transistor pair;

means connecting the collector of said second input transistor to the base of said second output transistor;

means including a second resistance connecting the collector of said second output transistor to the emitter of said second input transistor thereby to provide negative in-phase feedback around said second transistor pair;

means including a second capacitor connecting the collector of said second output transistor to the base of said second input transistor thereby to provide positive capacitive feedback around said second transistor pair;

circuit means for connecting said first and second output transistors in series across a DC potential source, said first and second output transistor being connected collector to collector through a third resistance which is in series with said first and second resistances; and means for connecting each of the wires in said telephone pair to the base of a respective one of said input transistors.

3. A negative capacitance element as set forth in claim 2 wherein said first and second input transistors are of the NPN and PNP conductivity types respectively and wherein said first and second output transistors are of the PNP and NPN conductivity types respectively.

4. A negative capacitance element as set forth in claim 3 wherein each of said transistor pairs is provided with an input terminal which is connected to the base of the respective input transistor through a blocking capacitor and wherein said capacitive feedback capacitors are connected to said input terminals.

5. A negative capacitance element as set forth in claim 2 including diode means for limiting voltages at the base terminals of said input transistors.

6. A negative capacitance element as set forth in claim 2 including diode means for limiting voltages at the collector terminals of said output transistors.

7. A negative capacitance element as set forth in claim 2 including a voltage divider connected across said voltage source and to the base terminals of said input transistors for forward biasing each of said transistor pairs and thereby dividing the voltage provided by said source among said first, second, and third resistances.

8. In a telephone system including a hybrid and switching means for connecting any one of a plurality of wire pairs to the input terminals of the hybrid, said wire pairs having different shunt capacitances, a compensating system comprising a plurality of capacitors connected across the pairs having the lower shunt capacitances and at least one negative capacitance element connected across a pair having a higher shunt capacitance.

9. A compensating system as set forth in claim 8 wherein said negative capacitance element includes:

a first input transistor of a first conductivity type;

a first output transistor of a second conductivity type which is complementary to said first type, said first input transistor and said first output transistor forming a first transistor pair;

means connecting the collector of said first input transistor to the base of said first output transistor;

means including a first resistance connecting the collector of said first output transistor to the emitter of said first input transistor thereby to provide negative in-phase feedback around said first transistor pair;

means including a first capacitor connecting the collector of said first output transistor to the base of said first input transistor thereby to provide positive capacitive feedback around said first transistor pair;

a second input transistor, said second input transistor being of said second conductivity type;

a second output transistor, said second output transistor being of said first conductivity type, said second input transistor and said second output transistor forming a second transistor pair;

means connecting the collector of said second input transistor to the base of said second output transistor;

means including a second resistance connecting the collector of said second output transistor to the emitter of said second input transistor thereby to provide negative in-phase feedback around said second transistor pair;

means including a second capacitor connecting the collector of said output transistor to the base of said second input transistor thereby the provide positive capacitive feedback around said second transistor pair;

circuit means for connecting said first and second output transistors in series across a DC potential source, said first and second output transistor being connected collector to collector through a third resistance which is in series with said first and second resistances; and means for connecting each of the wires in said higher capacitance pair to the base of a respective one of said input transistors.

10. A telephone transmission system comprising:

a succession of wire sections having substantially equal shunt capacitances and at least one section having a shunt capacitance substantially larger than the other sections;

a plurality of loading inductors connecting adjacent wire sections in said succession of sections; and a negative capacitance element connected to the section having the larger shunt capacitance for substantially cancelling that portion of the section's shunt capacitance which is in excess of the equal shunt capacitance exhibited by each of the other said sections.

11. A compensating system as set forth in claim 10 wherein said negative capacitance element includes:

a first input transistor of a first conductivity type;

a first output transistor of a second conductivity type which is complementary to said first type, said first input transistor and said first output transistor forming a first transistor pair;

means connecting the collector of said first input transistor to the base of said first output transistor;

means including a first resistance connecting the collector of said first output transistor to the emitter of said first input transistor thereby to provide negative in-phase feedback around said first transistor pair;

means including a first capacitor connecting the collector of said first output transistor to the base of said first input transistor thereby to provide positive capacitive feedback around said first transistor pair;

a second input transistor, said second input transistor being of said second conductivity type;

a second output transistor, said second output transistor being of said first conductivity type, said second input transistor and said second output transistor forming a second transistor pair;

means connecting the collector of said second input transistor to the base of said second output transistor;

means including a second resistance connecting the collector of said second output transistor to the emitter of said second input transistor thereby to provide negative in-phase feedback around said second transistor pair;

means including a second capacitor connecting the collector of said output transistor to the base of said second input transistor thereby to provide positive capacitive feedback around said second transistor pair;

circuit means for connecting said and second output transistors in series across a DC potential source, said first and second output transistor being connected collector to collector through a third resistance which is in series with said first and second resistances; and means for connecting the base terminals of said input transistors in parallel with said larger shunt capacitance thereby to cancel the excess portion thereof.